United States Patent [19]
Patton et al.

[11] Patent Number: 5,761,558
[45] Date of Patent: Jun. 2, 1998

[54] EXPANDED FILM CARTRIDGE BAR CODE

[75] Inventors: David Lynn Patton, Webster;
Lawrence Joseph Travis, Kendall;
Douglas Andrew McPherson, Hilton,
all of N.Y.

[73] Assignee: Eastman Kodak Company, Rochester, N.Y.

[21] Appl. No.: 462,933

[22] Filed: Jun. 5, 1995

[51] Int. Cl.$^6$ ................................................. G03B 17/48
[52] U.S. Cl. ........................... 396/429; 396/512; 355/77
[58] Field of Search ................................. 354/275, 106, 354/21

[56] References Cited

U.S. PATENT DOCUMENTS

| | | | |
|---|---|---|---|
| 4,782,365 | 11/1988 | Takagi | 355/38 |
| 4,888,613 | 12/1989 | Zangenfeind et al. | 355/41 |
| 4,965,628 | 10/1990 | Oliver et al. | 355/41 |
| 5,032,854 | 7/1991 | Smart et al. | |
| 5,083,155 | 1/1992 | Kataoka et al. | |
| 5,109,241 | 4/1992 | Keeney | |
| 5,124,742 | 6/1992 | Yoshikawa | 355/27 |
| 5,162,842 | 11/1992 | Shiota | 355/40 |
| 5,229,585 | 7/1993 | Lemberger et al. | |
| 5,309,199 | 5/1994 | Frick | 355/77 |
| 5,382,508 | 1/1995 | Ikenoue | |
| 5,389,983 | 2/1995 | Tsunefuji | |

*Primary Examiner*—David M. Gray
*Attorney, Agent, or Firm*—Frank Pincelli; Gordon M. Stewart

[57] ABSTRACT

A photographic film cartridge manufactured with an expanded bar code signifying characteristics of the print or photo CD order to be made from the filmstrip image frames particular to the camera in which the filmstrip was exposed or a pre-paid promotion or the like and a photofinishing method and system for use therewith. Additional numbers added at the time of manufacture to the DX bar code on the film cartridge and film package carry information about a customer's photofinishing order to the photofinisher. The additional information is put can include promotions offered by the film manufacturer or can supply additional information about the order, such as exposure format (e.g. a panoramic single use camera, camera) or special printing requirements.

8 Claims, 5 Drawing Sheets

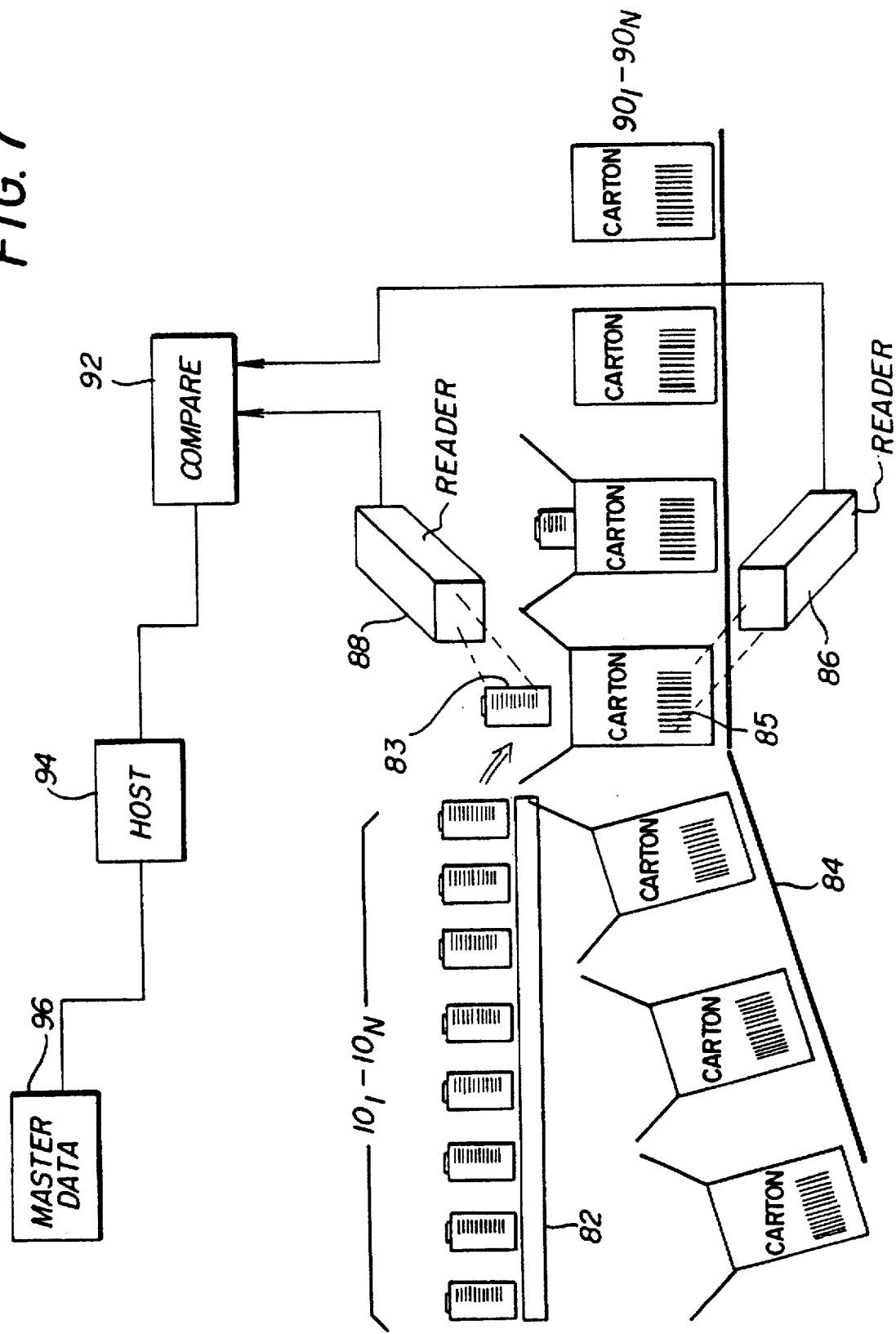

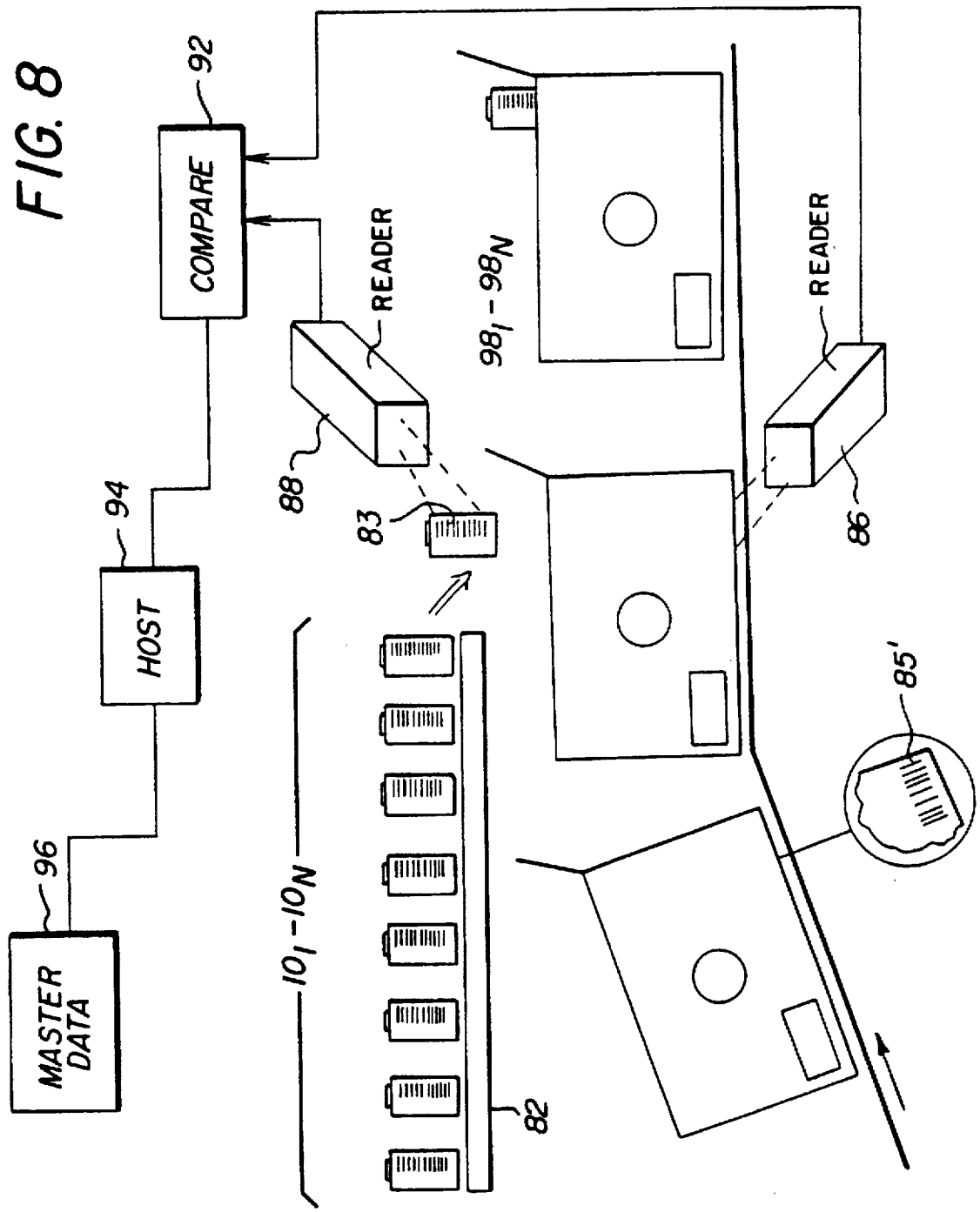

EXPANDED FILM CARTRIDGE BAR CODE

FIELD OF THE INVENTION

This invention relates to a photographic film cartridge manufactured with an expanded bar code signifying characteristics of the print or photo CD order to be made from the filmstrip image frames particular to the camera in which the filmstrip was exposed or a prepaid promotion or the like and a system for use therewith.

BACKGROUND OF THE INVENTION

Photofinishing of print orders and, more recently, Photo CD orders, from negative filmstrips involves a great many coordinated steps in the filmstrip developing and printing operations to ensure high quality in the resulting images and conformance in print numbers, types and billing of the order. Most large or traditional photofinishers employ a "batch" computer to do order tracking and billing, or to handle information about a specific order in batches of 50 to 100 photofinishing orders.

Customer photofinishing order information is written or carried on an order envelope label enclosing the film cartridge when the orders are returned to the photofinisher. The order information has to be transferred, usually manually, into the batch computer. The order information typically includes the customer name and address, the number of prints to be made, the size and finish of the prints, the film type, size and nominal number of filmstrip frames and additional special information. Certain promotions related to the price to be charged and no-charge duplicate prints or the like may be printed on the order envelope. The envelope also typically has a unique alphanumeric and bar coded order number to be machine read and used for order tracking.

A data record for a particular order is created when the order arrives at the photofinisher, and the unique bar coded order is scanned in from the envelope. Certain other coded information may also be read in. Any other information about the order written on the envelope, usually by the customer, has to be entered manually. The combination of customer errors and the transcription results in a high number of errors.

Even with the customer filling out the envelope, there is valuable information about the order that could be made use of prior to processing and printing that usually is not known until the film has been processed. One example is that the film came from a single use, recyclable camera. Such cameras are becoming more popular and have peculiar printing format requirements that should be accounted for when the filmstrips are printed. In this regard, typically the filmstrip in the single use camera is wound out of the cartridge and onto a spool when the single use camera is packaged for customer purchase. Then, the filmstrip is advanced back into the cartridge an image frame at a time as exposures are made. Because of the camera mechanism including the thumb actuated rewind mechanism engaging the cartridge hub, the filmstrip cartridge is upside down in comparison to its typical insertion into a typical camera. As a result, the exposed image is upside down from the exposed images typically made in a "permanent" camera where the filmstrip is advanced out of the film cartridge after each exposure is made and then re-wound back into the cartridge after all image frames are exposed.

The automated processing of filmstrips initially involves automatically orienting the film cartridges in the same cartridge axis direction and splicing the filmstrips together end-to-end as they are drawn from the cartridge. If film cartridges from single use cameras are intermingled with film cartridges from permanent cameras, the resulting spliced filmstrips will have image frames that are not in the same orientation. This does not affect the chemical processing of the spiced film roll, but interferes with the automated scanning of the image frames or viewing by a human operator when the image frames are to be photographically printed or converted to a Photo CD file. In regard to automated photographic printing, scene classification for determining printer color correction and exposure calculation depends on having the scene in the proper orientation. Scene information that is not properly determined can cause improper exposure and color corrections to be applied, requiring subsequent re-printing. Similar problems can arise in Photo CD scanning and conversion which may result in images displayed upside down on the video screen.

In addition, single use, recyclable, panoramic format cameras are also popular, and the image frames exposed therein require panoramic printing. Such a format has to be recorded manually with or on the customer envelope and transcribed into the batch computer memory.

In addition, there is no easy method of conveying to the photofinisher a promotion that was offered to the customer by the film manufacturer unless a coupon is enclosed. Single use camera packages or film cartridges sold at particular events or attractions may be offered for sale in a promotion that includes an extra pre-exposed image frame that may be offered at no print cost, and the packaging or coupon for that promotion may be discarded by the customer.

Other examples of special printing, such as prepaid processing, double prints, special services such as write-on prints, Photofile®, or Gallery® prints, are written on the envelope and need to be entered by hand.

SUMMARY OF THE INVENTION

The solution to these problems is to increase the information content of the DX bar code that is currently printed on the film cartridge at the time of manufacture to incorporate and convey such information.

In accordance with one aspect of the invention, a film cartridge for containing a photographic filmstrip comprises: an outer film cartridge shell having a bar code block positioned thereon between quiet zones; and an enhanced, machine readable bar code printed in said cartridge shell bar code block and encoded to provide the photofinisher with information about the processing of the film order when read out, said enhanced bar code incorporating a standard bar code of a standard number of digits signifying the characteristics of the filmstrip and incorporating at least one additional digit uniquely signifying a specific manner of completing the film order.

The following description of the invention sets forth a method and apparatus for adding additional numbers to the bar code on the film cartridge bar code to carry information about a customer's photofinishing order to the photofinisher. The additional information is put on the film cartridge at the time of manufacture and can include promotions offered by the film manufacturer or can supply additional information about the order such as exposure format or special printing requirements.

Order information that can be conveyed by the enhanced bar code on the cartridge may include one or more of the following promotions or conditions including cost free processing and printing or special services, including enlargements, bonus prints or other promotions or a special image frame and print format, such as panoramic or half frame formats or that the film cartridge is from a single use camera.

In a further aspect of the invention, a method of photofinishing print orders from photographic filmstrip image frames in film cartridges having a bar code block positioned between quiet zones on an outer film cartridge shell and a customer envelope having print order information thereon comprises the steps of: reading out and storing the print order information from the envelope in memory of a batch computer as customer print order data; reading an enhanced bar code from said cartridge shell bar code block and encoded to supply processing information about the processing of the print order when read out, said enhanced bar code incorporating a standard bar code of a standard number of digits signifying the processing characteristics of the filmstrip and incorporating at least one additional digit uniquely signifying a specific manner of completing the print order; storing the read out processing information in memory correlated with the customer print order data; from the read out information related to film characteristics, sorting film cartridges into preliminary photofinishing batches for filmstrips having like processing characteristics; from the read out information related to the specific manner of completing the film order, sorting film cartridges into final photofinishing batches for filmstrips having like manners of completion; correlating the print order information stored from customer envelopes with the final photofinishing batch in which the corresponding filmstrips are to be processed; photographically processing the filmstrips in each sorted final photofinishing batch; printing the filmstrips as print orders; and retrieving the print orders and combining each print order with the respective customer envelope.

Advantages of the Invention

The ability to obtain this particularized information automatically from the bar code on the cartridge is a great advantage in time savings and more importantly increases the probability of the fulfilling order information without errors introduced by the customer or the transcription of the customer's order information.

BRIEF DESCRIPTION OF THE DRAWINGS

These and other objects, advantages and features of the invention will become apparent from the detailed description given hereinafter in relation to the accompanying drawings, in which:

FIG. 7 is a schematic illustration of the method of filling encoded film packages with the correct film cartridges having the enhanced I 2/5 bar code of the various embodiments of the invention;

FIG. 8 is a schematic illustration of the method of filling encoded single use, special format or promotion, recyclable cameras with the correct film cartridges having the enhanced I 2/5 bar code of the various embodiments of the invention.

DETAILED DESCRIPTION OF THE PREFERRED EMBODIMENTS

Photographic filmstrips are packaged in cartridges having a machine-readable, Interleaved 2-of-5 (I 2/5) bar code pattern which provides a unique product identification number and the number of full frame exposures contained in the film cartridge.

The I 2/5 bar code content and location on the film cartridge is defined by the National Association of Photographic Manufacturers (NAPM). The cartridge bar code is located between the camera auto sensing (CAS) area and the cartridge lips. A human readable interpretation of the bar code is located between the bar code and the cartridge lips. "Quiet zones" containing no markings are defined on either side of the bar code and the human readable interpretation. In general, the bar code conforms to ANSI/NAPM standard IT1.14:1994, and an explanation of the I 2/5 bar code can be found in ANSI standard MH10.8M:1993 with exceptions for 135 film cartridges are found in IT1.14:1994.

In accordance with the specifications, digit 1 of the cartridge bar code can be any number from zero to nine, assigned at the film manufacturer's discretion, and digit 6 encodes the number of exposures on the filmstrip according to a table appearing in IT 1.14-1994, Pages 5 and 18. Digits 2, 3, 4, and 5 yield a film-product-class identification combination code number that identifies the manufacturer, e.g. Eastman Kodak, Co., the type of film, e.g. Kodacolor® Gold 100, Kodocolor® Gold Ultra 400, and the generation number, e.g. 1, 2, 3, etc.

For example, a typical DX number is 83-2 where 83 is the DX "combination code" number left of the dash and 2 is the "specifier" number right of the dash assigned to the film manufacturer by NAPM. Digits 2–5 result from multiplying the combination code number by 16 and then adding the specifier number to the product. The product of 83×16=1328 and 1328+2=1330; therefore, digits 2, 3, 4, and 5 of the cartridge bar code would be 1330 for a product with the NAPM DX number of 83-2.

Figure 2:
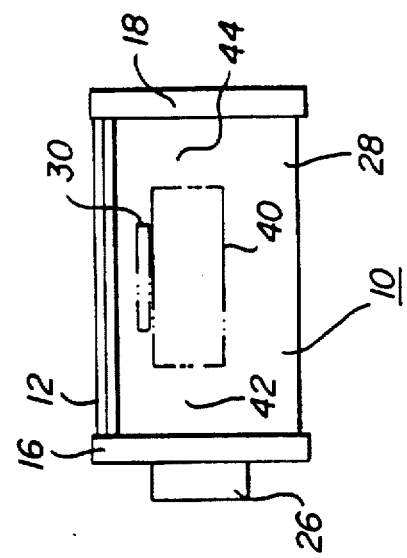
FIGS. 1 and 2 are end and side views of a prior art 135 type film cartridge showing the bar code and human readable information blocks specified in the standards.
Figure 1:
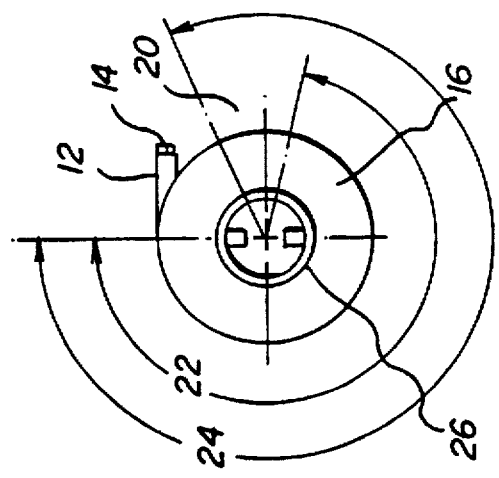

FIGS. 1 and 2 show end and side views, respectively, of the exterior of a typical, prior art, 135 type film cartridge 10 enclosing a 35 mm filmstrip. The end view of FIG. 1 shows the lip portion 12 of the 35 mm film cartridge 10 which includes the elongated, plush lined opening 14 where the filmstrip (not shown) exits and is rewound back into the film cartridge 10 and around a core 26. The specified angular location and height 20 of the DX bar code falls between dimensions 22 and 24 as related to the lip portion 12 and the film cartridge core 26, exposed through end cap 16.

The 35 mm film cartridge 10 is also shown in the side view of FIG. 2 and includes the end caps 16 and 18 attached to the cylindrical shell 28, including the lip portion 12. The bar code location block 40 including the six digit I 2/5 DX bar code (not shown) is also shown in relation to a human readable interpretation block 30 thereof extending along the top side of location block 40. Quiet zones 42 and 44 containing no markings are defined in the specifications on either side of the bar code location block 40 and extend above the human readable interpretation block 30.

Figure 3:
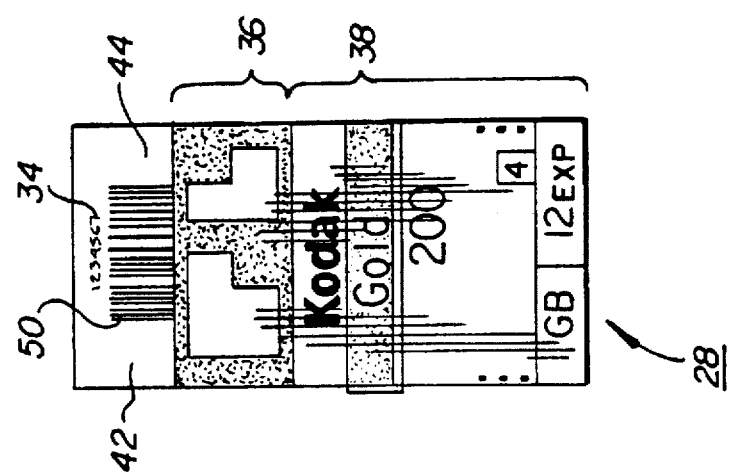
FIG. 3 is a view of the cartridge shell of FIG. 2 laid out flat and showing the location and appearance of the conventional, six digit, I 2/5 DX bar code.

FIG. 3 shows the shell 28 of the prior art film cartridge 10 peeled apart from the plush lined opening 14 and laid out flat to show the locations of the graphics and the typical six digit I 2/5 DX bar code 50 that fills the location block 40. FIG. 3 also shows the human readable interpretation 34 in block 30 in relation to the standard six digit I 2/5 bar code 50. The CAS (camera auto-sensing) code area 36 and the area 38 assigned for graphics and other use by the manufacturer are also shown on the flattened shell 28.

As described above, when the customer order is received in a photofinishing retail establishment or plant, the information on and in a customer order envelope is entered as a customer order. The film cartridge is then separated from the customer envelope for splicing to create a batch for processing. The unique customer envelope bar code along with the unique bar code number located on the splicer are employed to track the order.

Typically, in an automated photofinishing system, the DX bar code on the film cartridge shell is then read by a bar code reader located in an automatic filmstrip splicer, such as a Gretag® Ultima or Ultimax splicer, and as shown, for example in U.S. Pat. No. 4,888,613. The primary reason for reading the bar code at the splicer is to insure that the incorrect film type does not get spliced into a filmstrip batch to be processed and printed together. For example, it would be disastrous to splice and subsequently process a roll of Kodak® Kodachrome® film in a batch of Kodak® Kodacolor® film. Not only would the film be ruined, but the process would contaminated. The splicer compares the film cartridge DX bar code on the cartridge to the bar code for the film type being spliced and rejects film cartridges that are the incorrect film type for the batch of filmstrips being spliced together into a film roll for common processing and printing.

As the film cartridge I 2/5 bar code is read out at the splicer, it is also entered into the data base related to the envelope bar code. A unique bar coded number on the splicer and other order information, such as the film type, manufacturer, exposure length, and number of prints to be made per each negative, are also entered. This information about the batch of filmstrips being spliced together is also sent to the batch computer. This batch information is thereby linked to the customer information that was entered into the computer at the original order entry work station via the bar code on the customer envelope and the unique barcoded number on the splicer. Since the same computer or a linked computer network is used to perform these functions, the order tracking history for a specific order is updated at this time, e.g. "order 132474 has just been spliced into film roll 122".

It is also at this point that additional consumer order information can be incorporated with the batch information. This additional order information is obtained from the expanded DX bar code on the cartridge. Using the expanded DX bar code to convey the order information directly into the batch information by machine readable bar code eliminates the problem cases by hand entry, either by the consumer or the operator.

Figure 4:
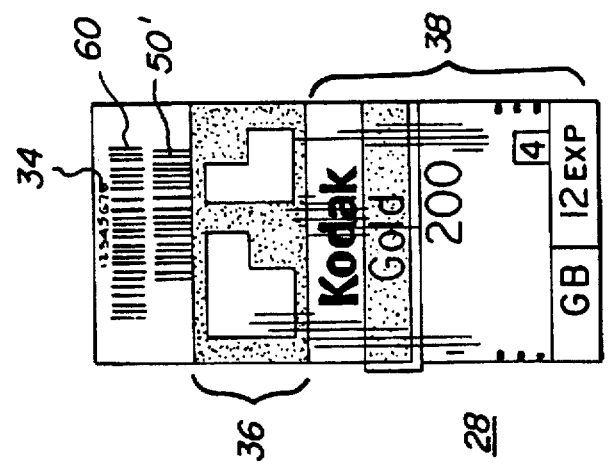
FIG. 4 is a view of a cartridge shell laid out flat showing the location and appearance of the enhanced DX bar code of the present invention in a first embodiment thereof.

Now referring to FIG. 4, it shows a further shell 28 of a 35 mm film cartridge 10 peeled apart and laid flat showing one embodiment of the enhanced I 2/5 bar code of the present invention printed in the bar code location block 40. In the embodiment shown in FIG. 4, an enhanced, eight digit I 2/5 bar code 60 is printed above a shortened (height only) version of the standard six digit I 2/5 bar code 50' and adjacent to the human readable interpretation 34.

The DX bar codes 60 and 50' are both shorter than the conventional bar code block height 20, but the combined heights exceed the single code height 20. The enhanced eight digit code 60 extends into the quiet zone and shifts the position of the human readable interpretation block 30 upward, but the combined heights still meet the quiet zone requirements. It should be noted that rather than duplicating the conventional six digit I 2/5 bar code, the enhanced, eight digit I 2/5 bar code 60 may be solely devoted to the additional information and may have fewer than eight digits.

Figure 5:
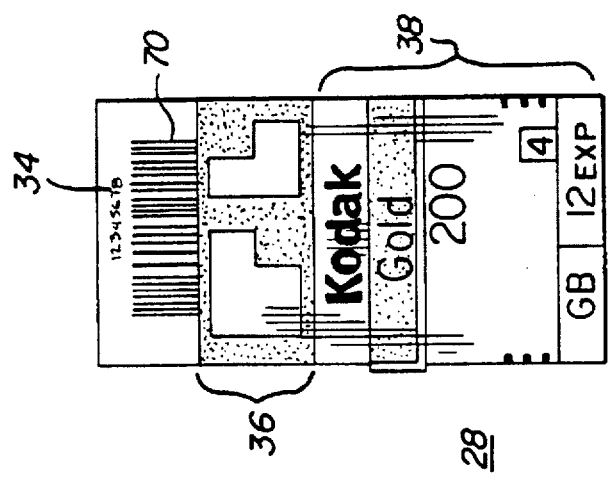
FIG. 5 is a view of a cartridge shell laid out flat showing the location and appearance of the enhanced DX bar code of the present invention in a second embodiment thereof.

Referring now to FIG. 5, it shows the preferred embodiment of the enhanced, eight digit I 2/5 bar code 70 along with the human readable interpretation 34 positioned on the flattened cartridge shell 28. In this embodiment, the conventional six digit I 2/5 bar code is replaced entirely in the expectation that all the information in the original six-digit code 50 plus the additional customer order information is incorporated into the single, enhanced I 2/5 bar code 70.

Figure 6:
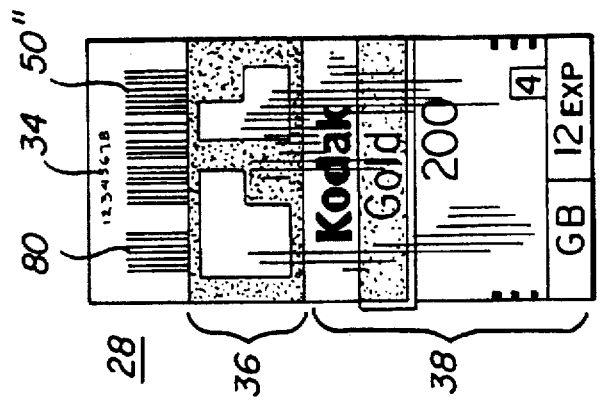
FIG. 6 is a view of a cartridge shell laid out flat showing the location and appearance of the enhanced DX bar code of the present invention in a third embodiment thereof.

FIG. 6 shows a third embodiment of an enhanced I 2/5 DX bar code 80 positioned in the bar code block 40 of the cartridge shell 28 along with the human readable interpretation 34. In the embodiment shown in FIG. 6, the DX bar code is increased by two digits by adding a second, spaced two digit I 2/5 bar code 80 to the conventional six digit I 2/5 bar code 50. The height of the additional two digit I 2/5 bar code 80 and the conventional six digit bar code 60 conform to the height 20 of the bar code block 40. The combined two digit and six digit I 2/5 bar codes 80 and 60 extend into the quiet zones 42 and 44, but leave a sufficient width of each to satisfy standards.

In each of the above described and depicted embodiments, the human readable interpretation 34 may be an alpha-numeric code that contains the same information as the enhanced and standard bar codes. If a film cartridge bar code reader is disabled or not available, the code can be read out visually and decoded by reference to a code table.

In each embodiment of FIGS. 3–5, the information of the additional two (or more) digits can be decoded using available reflective bar code scanners and decoding software as shown in the above-referenced '613 patent. The additional two or more digits can be coded to signify the following types of order information, or order characteristics, for example:

If the film when purchased included the price of processing and printing. This information would be read out and provided to the billing computer.

If any special services were included with the film purchase, such as Photofile® prints, Gallery® prints, write-on prints, Photo CD, bonus prints, or the like.

If the order requires a special print format such as a panoramic or a half frame print.

If the film cartridge is from a single use camera.

If a free enlargement of one or more image frames or other promotions are included with the order.

In order to implement such an enhanced, eight (or more) digit I 2/5 bar code signifying diverse types of order information, it must be assured that the proper coded film cartridge 10 for the particular application or use is packaged in the proper container. Typically, film cartridges are packaged in light tight retail packages including boxes or rack hangers or are packaged within a single use, recyclable camera, e.g. a Kodak® "Fun Saver 35®"camera package. The package may be printed with a bar code for use by the retailer for pricing and inventory control that also identifies the film type.

Turning to FIG. 7, it schematically depicts loading of the film cartridges $10_1$–$10_n$ advancing on a cartridge conveyer 82 into one of the packages $90_1$–$90_n$ advancing on a package conveyer 84 under a packaging control system. The packaging control system includes the package bar code reader 86 and the film cartridge bar code reader 88. The film cartridge bar code reader 88 reads the bar code 83 on the film cartridges $10_l$–$10_n$, and the custom bar code reader 86 reads the package bar code 85 on each one of the packages $90$–$90_n$. The read out bar codes are compared in comparator 92, and the results are provided to a host computer 94 and stored in master data 96. The compared and stored data is used to ensure that the information in the film cartridge bar code 83 matches the order information on the package bar code 85. If the comparison shows non-matching information, then the package 90 and film cartridge 10 may be rejected from further processing at a downstream point on conveyer 84.

It will be understood that the film cartridges $10_l$–$10_n$ may also be loaded in the same fashion into single use, recyclable camera bodies typically packaged in a cardboard outer packages $98_l$–$98_n$ with graphics thereon and with openings for accessing camera controls and for exposing the electronic flash and taking lens. FIG. 8 illustrates this process and the location of the package bar code 85' on each one of the camera packages $98_l$–$98_n$.

Figure 9:
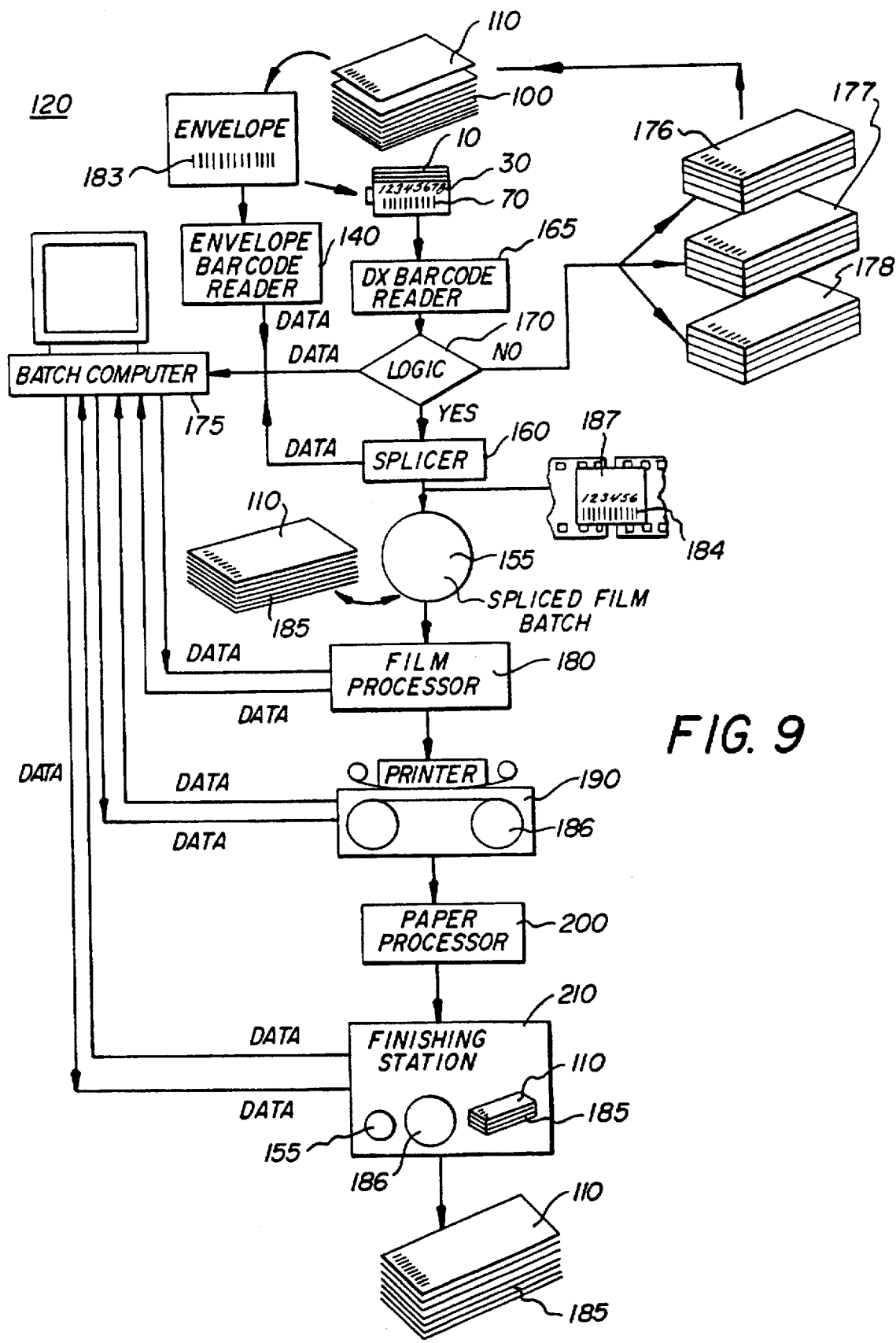
FIG. 9 is a schematic drawing showing the path of an order through a photofinishing plant using the enhanced I 2/5 DX bar codes of the various embodiments to provide the photofinisher with information about the customer's order.

Referring now to FIG. 9, it is a schematic illustration showing the flow of each customer develop and print order in an order stack 100 through a photofinishing facility or lab 120. The blocks and schematically illustrated icons of FIG. 9 represent equipment used in and the steps of processing and completing print orders. In this illustration, it is assumed that the enhanced, eight digit I 2/5 bar code 70, for example, having a specific order characteristic is present in the film cartridges being processed. For example, the sought for order characteristic may be a panoramic image frame format of film cartridges removed from panoramic format, single use camera packages, e.g. the Kodak® Fun Saver Panoramic 35, single use camera. In this case, the film cartridge 10 is removed from the single use camera by the photofinisher or retail establishment and placed in a customer envelope 110 together with the hand entered information described above.

At the photofinishing facility, the 35mm film cartridge 10 is first taken out of the envelope 110 and fed into the splicer 160 and the envelope 110 is fed through an envelope bar code reader 140. As the film cartridge 10 enters the splicer 160, the enhanced DX bar code 70 is read out in DX bar code reader 165 located inside the splicer 160. The read out code data from the DX bar code 70 is sent to the logic 170 and decoded to derive the film cartridge order characteristic. In this regard, from the read out information related to film characteristics contained in the standard bar code, the film cartridges are sorted into photofinishing batches for filmstrips having like processing characteristics. From the read out information related to the specific manner of completing the film order contained in the enhanced DX bar code, the film cartridges are sorted into photofinishing batches for filmstrips having like manners of completion. In this example, it may be assumed that batch 155 includes all filmstrips that can be chemically processed using the same process and having a panoramic format.

The read out film cartridge order characteristics are therefore compared to these characteristics of a defined film batch 155 of customer filmstrip orders being spliced together by splicer 160. The customer orders in the batch 155 are linked together by the envelope bar code 183 and the unique bar code number 184 on the splice 187 indicating the panoramic print format, for example. The envelope bar code 183 is read out by the envelope bar code reader 140 and fed to the batch computer 175. Other information on each envelope 110 may also be manually entered as data related to the order stored in batch computer 175. The order characteristics of the batch 155 being spliced are held in the memory of the batch computer 175, and the logic 170 compares these characteristics via the operation of computer 175.

If the order characteristics of the film cartridge 10 being entered do not match those of the batch 155 in the process of being spliced together, the film cartridge 10 is rejected. The order characteristic also appears in the human readable interpretation 30, and the operator can read it and place the ejected cartridge with the appropriate similar batches 176, 177, and 178 being accumulated for processing that have like order characteristics. For example, batch 176 might include all film cartridges with the designation requiring half frame printing, batch 177 might be all film cartridges with the designation requiring a Photofile® print to be printed as part of the order, and batch 178 might be all orders requiring two prints of each negative in the order.

Alternatively, the read out order characteristics may be employed to automatically route the film cartridge 10 to the appropriate batch for parallel processing. In either case, the read out order characteristics are stored in batch computer 175 in association with the order information entered from the customer envelope 110. Each customer envelope 110 is added to a batch envelope stack 185 associated with batch 155. The customer envelope correlated with a rejected film cartridge is added to the envelopes in the batch with like characteristics, for example, batch envelope stack 176, 177 or 178.

If the order characteristics of the film cartridge 10 match those of the batch 155 being spliced, the filmstrip is removed from the film cartridge 10 and is spliced to the film roll of the batch 155 being assembled for processing in the processor 180 using bar coded splice 187. The splice bar code is associated with the read out film cartridge bar code information about the characteristics of the filmstrip in film cartridge 10 and the customer envelope information as batch information in memory in the batch computer 175 all in relation to batch 155.

After the batch 155 has been spliced together by the splicer 160 and a film roll has been completed, the film roll is processed in film processor 180. The envelope stack 185 of batch 155 travels with the spliced film roll. At each of the photofinishing operations, the batch information stored in batch computer 175 is updated to signify that the operation has been completed.

Following processing in film processor 180, the film roll comprising batch 155 goes to the photographic printer 190 to be printed. For example, the printer 190 may be set up to print the panoramic type image frames of batch 155. Printer 190 receives information from the batch computer 175 about batch 155, and the batch computer 175 is again updated on the status of batch 155.

After printing, the exposed print paper roll 186 is processed in paper processor 200, and the processed print roll of prints belonging to batch 155 is forwarded to the order finishing station 210 with the batch envelope stack 185, batch information from the batch computer, and the spliced, processed film roll. At the order finishing station 210, batch 155 is completed by cutting the negatives and prints, putting them in the correct customer envelope, and pricing each order. The information that was initially entered from film cartridge 10 about the customer's order 155 is recalled from the batch computer 175 and used to verify that the customer received the services that were required and that the correct billing amount was printed on the envelope. Each finished customer order in batch 155 is returned through the retailer or the mail to the customer.

Parallel printers (not shown) are typically set up to print specific batches, e.g. batches 176, 177, 178 having other order characteristics which require different printing operations. A photofinishing facility might have two or three film processors and as many as ten printers set up for differing formats.

In accordance with the invention, the information that is entered from the enhanced bar code appearing on the film cartridge therefore speeds the photofinishing operations and increases the accuracy of the operations.

While there has been shown what are considered to be the preferred embodiments of the invention, it will be manifest that many changes and modifications may be made therein without departing from the essential spirit of the invention. It is intended, therefore, in the following claims to cover all such changes and modifications as may fall within the true scope of the invention.

PARTS LIST FOR FIGS. 1–9 film cartridge 10
film cartridges 10₁–10ₙ
lip portion 12
elongated, plush lined opening 14
end caps 16 and 18
DX bar code height 20
dimensions 22 and 24
film cartridge core 26
cylindrical shell 28
human readable interpretation block 30
CAS code area 36
graphics area 38
bar code location block 40
quiet zones 42 and 44
standard six digit I 2/5 bar code 50
shortened six digit I 2/5 bar code 50'
first enhanced, eight digit I 2/5 DX bar code 60
second enhanced, eight digit I 2/5 bar code 70
enhanced, two digit I 2/5 bar code 80
cartridge conveyer 82
film cartridge bar code 83
package conveyer 84
package bar code 85
package bar code reader 86
film cartridge bar code reader 88
film packages 90₁–90ₙ
comparator 92
host computer 94
master data 96
single use camera packages 98₁–98ₙ
order stack 100
envelope 110
photofinishing facility or lab 120
envelope bar code reader 140
defined batch 155
splicer 160
splicer DX bar code reader 165
logic 170
batch computer 175
batch envelope stacks 176, 177, and 178
film processor 180
envelope bar code 183
splice bar code number 184
batch envelope stack 185
exposed print paper roll 186
splice 187
photographic printer 190
paper processor 200
order finishing station 210

We claim:

1. A method of photofinishing print orders from photographic filmstrip image frames in film cartridges having a bar code block positioned between quiet zones on an outer film cartridge shell and a customer envelope having print order information thereon comprising the steps of:

reading out and storing the print order information from the envelope in memory of a batch computer as customer print order data;

reading an enhanced bar code from said bar code block, said bar code being encoded to supply a photofinisher with information about processing of a customer's photographic print order when said bar code is read out, said enhanced bar code incorporating (a) a standard bar code of a standard number of digits signifying a film type and a number of frames of the filmstrip and (b) at least one additional digit uniquely signifying a number, types, sizes, frame formats, and/or price of photographic prints to be made to complete said print order after the filmstrip has been exposed;

storing the read out processing information in memory correlated with the customer print order information;

from the read out information related to film type, sorting film cartridges into preliminary photofinishing batches for filmstrips having like processing characteristics;

from the read out information related to number, types, sizes, frame formats, and/or price, sorting film cartridges into final photofinishing batches for filmstrips having like manners of completion of a print order, and completing the print order in accordance with this read out information, including:

correlating the print order information stored from customer envelopes with the final photofinishing batch in which the corresponding filmstrips are to be processed;

photographically processing the filmstrips in each sorted final photofinishing batch;

printing the filmstrips as print orders; and retrieving the print orders and combining each print order with the respective customer envelope.

2. The method of claim 1 wherein said at least one additional bar code means further comprises a digit signifying that the film when purchased included the price of processing and printing.

3. The method of claim 1 wherein said at least one additional bar code means further comprises a digit signifying that special services were included with the film purchase related to said number, types or sizes of prints to be made.

4. The method of claim 1 wherein said at least one additional bar code means further comprises a digit signifying that the order requires use of a special printer to print an atypical image frame format.

5. The method of claim 1 wherein said at least one additional bar code means further comprises a digit signifying that the order includes free enlargements.

6. The method of claim 1 wherein said at least one additional bar code means further comprises a digit signifying that the filmstrip was exposed in a single use, recyclable camera.

7. The method of claim 1 wherein:

the step of sorting film cartridges into final photofinishing batches for filmstrips having like manners of completion further comprises the steps of:

splicing the filmstrips of the final photofinishing batch together with a splice bearing a splice bar code identifying the final photofinishing batch; and storing splice bar code information of the final photofinishing batch in association with the print order information and the cartridge shell bar code information of each order in the final photofinishing batch in memory of the batch computer as customer order information.

8. The method of claim 7 further comprising the step of:

sorting the customer envelopes into a corresponding customer envelope batch; and the step of retrieving the print orders and combining them with the customer envelope further comprises the step of:

correlating the customer envelope batches with the print orders employing the customer order information at a finishing station.

\* \* \* \* \*